United States Patent
Kimura et al.

(10) Patent No.: US 9,165,588 B2
(45) Date of Patent: Oct. 20, 2015

(54) PATTERN FORMATION METHOD AND MAGNETIC RECORDING MEDIUM MANUFACTURING METHOD

(71) Applicant: KABUSHIKI KAISHA TOSHIBA, Minato-ku (JP)

(72) Inventors: Kaori Kimura, Yokohama (JP); Kazutaka Takizawa, Kawasaki (JP); Akira Fujimoto, Kawasaki (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 2 days.

(21) Appl. No.: 14/152,249

(22) Filed: Jan. 10, 2014

(65) Prior Publication Data

US 2015/0069013 A1    Mar. 12, 2015

(30) Foreign Application Priority Data

Sep. 10, 2013  (JP) .................................. 2013-187498

(51) Int. Cl.
  *B44C 1/22*    (2006.01)
  *G11B 5/855*   (2006.01)
(52) U.S. Cl.
  CPC ...................................... *G11B 5/855* (2013.01)
(58) Field of Classification Search
  USPC ...................... 216/22; 428/836; 427/123, 130
  See application file for complete search history.

(56) References Cited

U.S. PATENT DOCUMENTS

| 4,759,991 | A  | * | 7/1988 | Kanno et al. .................. 428/447 |
| 7,547,503 | B2 |   | 6/2009 | Ito et al. |
| 8,207,242 | B2 |   | 6/2012 | Nomoto et al. |
| 8,790,525 | B2 | * | 7/2014 | Hiwatari et al. ................ 216/22 |
| 2010/0183866 | A1 |   | 7/2010 | Fujimoto et al. |
| 2014/0120375 | A1 | * | 5/2014 | Takizawa et al. ............. 428/836 |

FOREIGN PATENT DOCUMENTS

| JP | 2007-69272  | 3/2007 |
| JP | 2010-26182  | 2/2010 |
| JP | 2010-170726 | 8/2010 |
| JP | 2011-12165  | 1/2011 |

OTHER PUBLICATIONS

U.S. Appl. No. 14/197,674, filed Mar. 5, 2014, Kimura, et al.
U.S. Appl. No. 14/455,058, filed Aug. 8, 2014, Kimura, et al.

* cited by examiner

*Primary Examiner* — Duy Deo
*Assistant Examiner* — Maki Angadi
(74) *Attorney, Agent, or Firm* — Oblon, McClelland, Maier & Neustadt, L.L.P.

(57) ABSTRACT

According to one embodiment, a magnetic recording layer is coated with a fine particle coating solution containing fine particles coated with a protective layer containing a first additive including a straight-chain structure for increasing wettability to the magnetic recording layer, and a carboxy group or the like, and a second additive including a carboxy group or the like and a polymerizable functional group, each fine particle having, on at least a surface thereof, a material selected from Al, Si, Ti, V, Cr, Mn, Fe, Co, Ni, Zn, Y, Zr, Sn, Mo, Ta, W, and oxides thereof, thereby forming a fine particle monolayer, and heat or light energy is applied, thereby curing the protective layer and forming a periodic pattern.

24 Claims, 6 Drawing Sheets

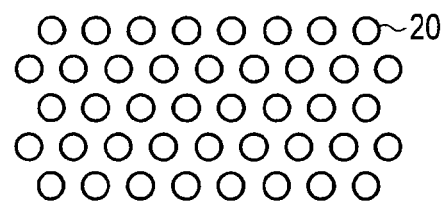
F I G. 1
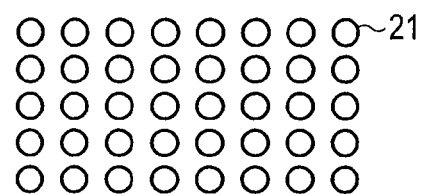
F I G. 2
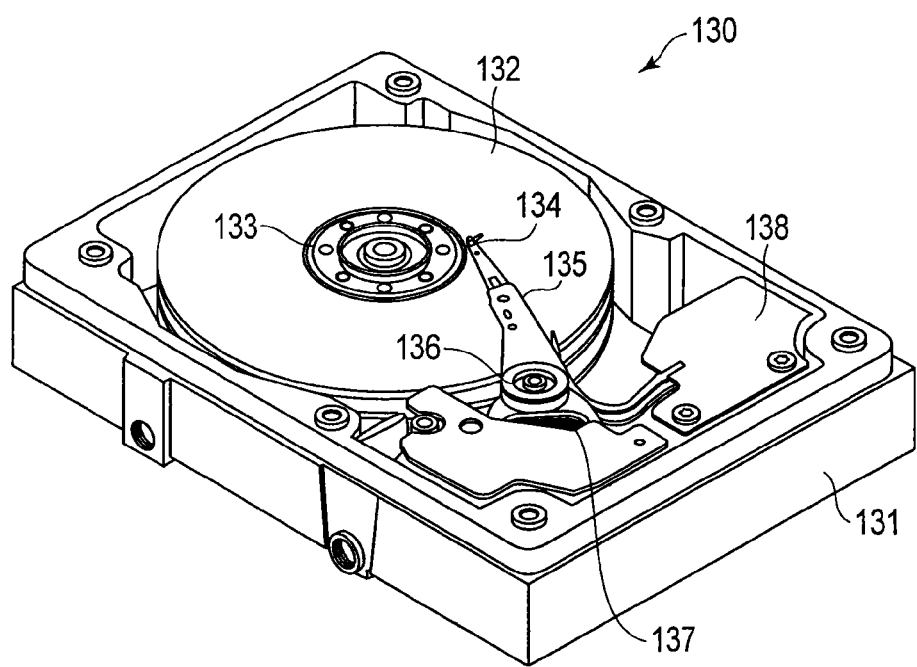
F I G. 3

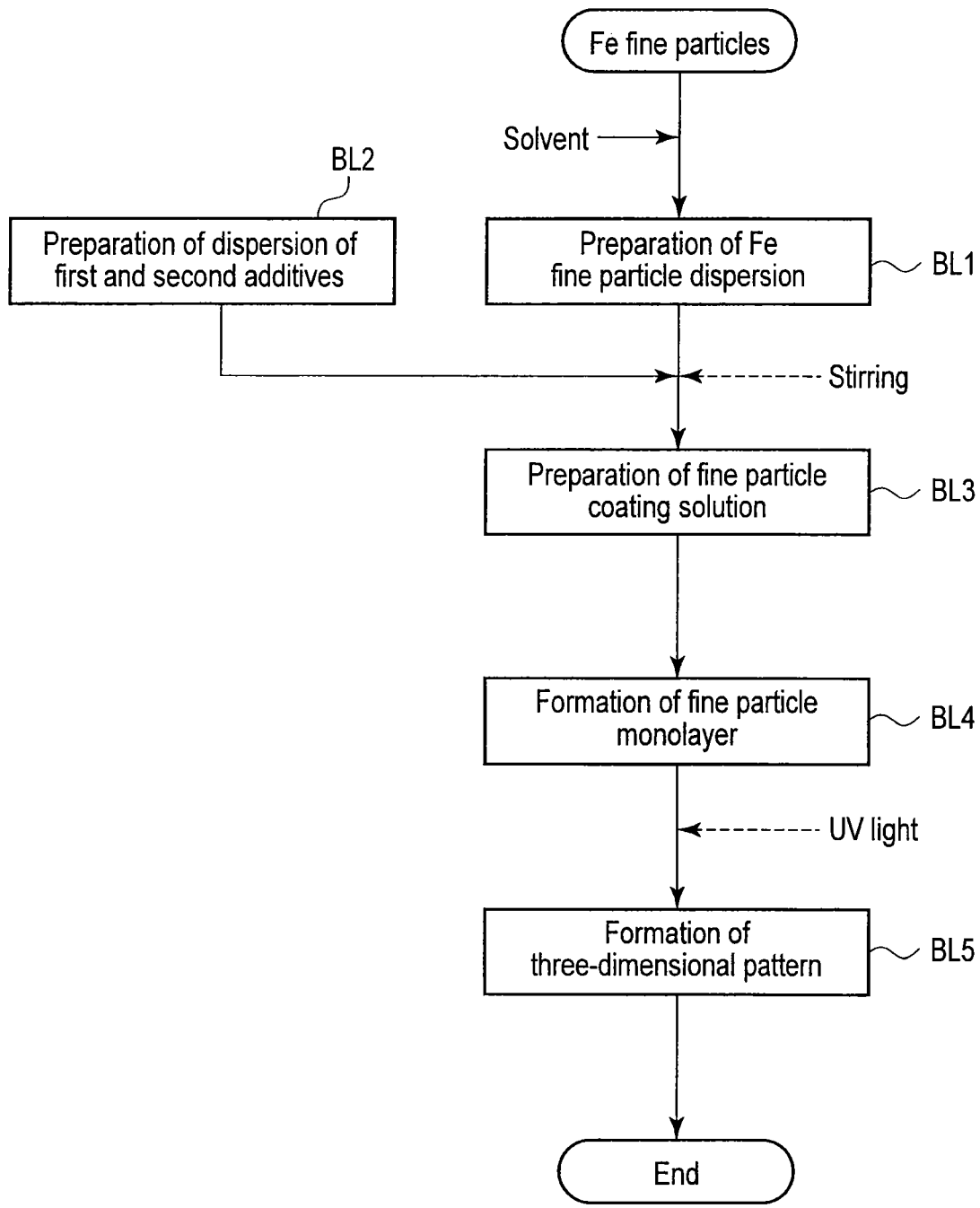
F I G. 4

PATTERN FORMATION METHOD AND MAGNETIC RECORDING MEDIUM MANUFACTURING METHOD

CROSS-REFERENCE TO RELATED APPLICATIONS

This application is based upon and claims the benefit of priority from Japanese Patent Application No. 2013-187498, filed Sep. 10, 2013, the entire contents of which are incorporated herein by reference.

FIELD

Embodiments described herein relate generally to a pattern formation method and magnetic recording medium manufacturing method.

BACKGROUND

Nanometer-order micropatterning techniques continue to improve, with the semiconductor industry taking the initiative, and patterning at a level of a few tens of nanometers to a few nanometers has recently become possible. Patterning techniques are used not only in the semiconductor field but also in various other fields such as displays, electronic materials, catalysts, and memory materials.

In particular, it is being contemplated to apply micropatterning techniques to hard disk drives (HDDs). It is possible to increase the magnetic particle volume per bit and increase the thermal stability by patterning the recording medium of an HDD. Also, jitter noise can be reduced because particle sizes can be made uniform compared to a granular medium manufactured by sputtering. A magnetic recording medium like this is called a patterned medium (patterned media). In this patterned medium, it is important to make the sizes and arrangements of patterned magnetic particles uniform.

In a device having a nanostructure such as a patterned medium, fine particles can be applied as a template for forming the nanostructure. It is possible to transfer a fine particle shape to a magnetic recording medium or anti-reflection film, and grow a carbon nanotube (CNT) by using fine particles themselves as a catalyst. It is necessary to uniformly arrange particles on a substrate and subject the particles to a subsequent process regardless of whether the particles form a monolayer or multiple layers. During the process, the surface of each fine particle is exposed by etching a protective group covering the surface of the fine particle. This process poses the problem that the particles are charged by plasma and aggregate to each other.

BRIEF DESCRIPTION OF THE DRAWINGS

FIG. 1 is a view showing an example of a periodic pattern formable by a method according to an embodiment;

FIG. 2 is a view showing another example of the periodic pattern formable by the method according to the embodiment;

FIG. 3 is a partially exploded perspective view showing an example of a magnetic recording/reproduction apparatus to which a magnetic recording medium according to the embodiment is applicable;

FIG. 4 is a flowchart showing a method of forming a periodic pattern to be used in the first embodiment;

DETAILED DESCRIPTION

Figure 5A:
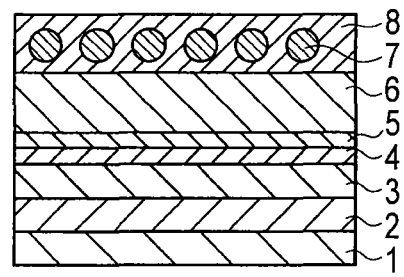
FIGS. 5A, 5B, 5C, 5D, and 5E are exemplary sectional views showing steps of forming a magnetic recording medium according to the first embodiment.

Embodiments will be explained below with reference to the accompanying drawings.

A magnetic recording medium manufacturing method according to the first embodiment includes
    forming a magnetic recording layer on a substrate,
    forming a mask layer on the magnetic recording layer,
    coating the mask layer with a fine particle coating solution containing fine particles coated with a protective layer containing a mixture of a first additive including a straight-chain structure for increasing wettability to the mask layer, and at least one type of a group selected from the group consisting of an amino group, a carboxy group, a hydroxy group, and a sulfo group, and a second additive including at least one type of a group selected from the group consisting of an amino group, a carboxy group, a hydroxy group, and a sulfo group, and a polymerizable functional group, each fine particle having, on at least a surface thereof, a material selected from the group consisting of aluminum, silicon, titanium, vanadium, chromium, manganese, iron, cobalt, nickel, zinc, yttrium, zirconium, tin, molybdenum, tantalum, tungsten, and oxides thereof, thereby forming a fine particle monolayer on the mask layer,
    applying heat or light energy to the fine particle layer to cause a reaction of the polymerizable functional group, thereby curing the protective layer and fixing the protective layer on the mask layer,
    transferring a periodic pattern formed by the fine particle layer to the mask layer,
    transferring the periodic pattern to the magnetic recording layer, and
    removing the mask layer from the magnetic recording layer.

In the first embodiment, a periodic pattern in which fine particles are arranged without any aggregation in a fine particle monolayer is obtained. Accordingly, a patterned medium in which the size distribution of magnetic particles is low is obtained.

The "periodic pattern" herein mentioned is a pattern array having a predetermined regularity. The pattern can be one or both of a three-dimensional pattern and a pattern of materials having different chemical compositions. For example, when Fe particles are arranged as they are buried in a polymethylmethacrylate matrix, an array of materials having different chemical compositions is obtained although there is no three-dimensional structure. Also, when the polymethylmethacrylate matrix is removed by an RIE process, only the Fe particles remain to form a three-dimensional pattern. The "predetermined regularity" means that an array of projections and recesses or an array of materials having different chemical compositions is formed. The array can be a hexagonal close-packed array or square array. The array includes at least 100 patterns. A regularly arranged region is called a domain, and a fine particle array in the embodiment can have a plurality of domains. The array is disturbed in the boundary between domains.

A magnetic particle is a region in a magnetic recording layer where the magnetic material causes magnetization reversal as a single particle. An example is a magnetic particle having a regular structure. The regular structure can be a single crystal, a film including alternately stacked layers such as an $L1_0$ structure, or an artificial lattice holding the same orientation. Also, in a structure such as a granular medium in which magnetic grains are buried in a nonmagnetic matrix, a magnetic portion in the matrix is the magnetic particle herein mentioned. The particle size dispersion of the magnetic particles directly translates into jitter noise in recording/reproduction. A medium having a small particle size dispersion is ideal. In the embodiment, the magnetic recording layer is divided by using the periodic pattern of the fine particles. Therefore, the particle size dispersion of the fine particles is almost equal to the grain size dispersion of the magnetic grains.

Furthermore, the mask layer is a layer to which the fine particle coating solution is applied, and can be either a monolayer or multilayered film as needed. When using a multilayered film, the straight-chain structure of the second additive can properly be selected in order to secure sufficient wettability between the layer to which the fine particle coating solution is to be applied and the fine particle coating solution.

The second embodiment is a magnetic recording medium manufacturing method in which a periodic pattern is formed by fine particles and a magnetic recording layer is stacked on the pattern, and characterized by including coating a substrate with a fine particle coating solution containing fine particles coated with a protective layer containing a mixture of a first additive including a straight-chain structure for increasing wettability to the substrate, and at least one type of a group selected from the group consisting of an amino group, a carboxy group, a hydroxy group, and a sulfo group, and a second additive including at least one type of a group selected from the group consisting of an amino group, a carboxy group, a hydroxy group, and a sulfo group, and a polymerizable functional group, each fine particle having, on at least a surface thereof, a material selected from the group consisting of aluminum, silicon, titanium, vanadium, chromium, manganese, iron, cobalt, nickel, zinc, yttrium, zirconium, tin, molybdenum, tantalum, tungsten, and oxides thereof, thereby forming a fine particle monolayer, applying heat or light energy to the fine particle layer to cause a reaction of the polymerizable functional group, thereby curing the protective layer and fixing the protective layer on the substrate, removing the protective layer between the fine particles by etching, thereby forming a periodic pattern by the fine particles; and forming a magnetic recording layer on the periodic pattern.

In the second embodiment, a periodic pattern in which fine particles are arranged without any aggregation in a fine particle monolayer is obtained. A patterned medium in which the size distribution of magnetic particles is low is obtained by forming a magnetic recording layer on the periodic pattern.

The substrate is a layer to which the fine particle coating solution is to be applied, and can be either a monolayer or multilayered film as needed. When using a multilayered film, the straight-chain structure of the second additive can properly be selected in order to ensure sufficient wettability between the layer to which the fine particle coating solution is to be applied and the fine particle coating solution.

A magnetic recording medium manufacturing method according to the third embodiment is a magnetic recording medium manufacturing method in which a periodic pattern is formed on an underlayer by using fine particles as masks and a magnetic recording layer is stacked, and includes forming an underlayer on a substrate, coating the underlayer with a fine particle coating solution containing fine particles coated with a protective layer containing a mixture of a first additive including a straight-chain structure for increasing wettability to the underlayer, and at least one type of a group selected from the group consisting of an amino group, a carboxy group, a hydroxy group, and a sulfo group, and a second additive including at least one type of a group selected from the group consisting of an amino group, a carboxy group, a hydroxy group, and a sulfo group, and a polymerizable functional group, each fine particle having, on at least a surface thereof, a material selected from the group consisting of aluminum, silicon, titanium, vanadium, chromium, manganese, iron, cobalt, nickel, zinc, yttrium, zirconium, tin, molybdenum, tantalum, tungsten, and oxides thereof, thereby forming a fine particle monolayer, applying heat or light energy to the fine particle layer and causing a reaction of the polymerizable functional group, thereby curing the protective layer and fixing the protective layer on the underlayer, transferring a periodic pattern formed by the fine particle layer to the underlayer, and forming a magnetic recording layer on the underlayer.

In the third embodiment, a periodic pattern in which fine particles are arranged without any aggregation in a fine particle monolayer is obtained. A patterned medium in which the size distribution of magnetic particles is low is obtained by transferring the periodic pattern to the underlayer, and forming a magnetic recording layer on the periodic pattern.

The underlayer is a layer to which the fine particle coating solution is to be applied, and can be either a monolayer or multilayered film as needed. When using a multilayered film, the straight-chain structure of the second additive can properly be selected in order to ensure sufficient wettability between the layer to which the fine particle coating solution is to be applied and the fine particle coating solution.

A pattern formation method according to the fourth embodiment includes coating a target layer with a fine particle coating solution containing fine particles coated with a protective layer containing a mixture of a first additive including a straight-chain structure for increasing wettability to a surface of the target layer, and at least one type of a group selected from the group consisting of an amino group, a carboxy group, a hydroxy group, and a sulfo group, and a second additive including at least one type of a group selected from the group consisting of an amino group, a carboxy group, a hydroxy group, and a sulfo group, and a polymerizable functional group, each fine particle having, on at least a surface thereof, a material selected from the group consisting of aluminum, silicon, titanium, vanadium, chromium, manganese, iron, cobalt, nickel, zinc, yttrium, zirconium, tin, molybdenum, tantalum, tungsten, and oxides thereof, thereby forming a fine particle monolayer on the target layer, and applying heat or light energy to the fine particle layer to cause a reaction of the polymerizable functional group, thereby curing the protective layer and fixing the protective layer on the target layer, and forming a periodic pattern by the fine particle layer.

The pattern formation method according to the fourth embodiment is a method of forming a periodic pattern by a fine particle layer, and is used to form, for example, the periodic patterns to be used in the first to third embodiments.

When the pattern formation method according to the fourth embodiment is used, a periodic pattern in which fine particles are arranged without any aggregation is obtained.

The target layer is a layer whose surface is to be coated with the fine particle coating solution, and includes either a layer to be finally processed into a periodic pattern, or a stack including a layer to be finally processed into a periodic pattern and a layer to be removed from the former layer.

Also, the fine particle layer can be either a monolayer or multilayered film as needed. When applying a periodic pattern to a magnetic recording medium, the fine particle layer can be a monolayer.

The individual members to be used in the embodiments will be explained below.

<Fine Particles>

The fine particles to be used in the embodiments are fine particles having a particle size of 1 nm to 1 μm. The shape is often a sphere, but it is also possible to use a shape such as a tetrahedron, rectangular parallelepiped, octahedron, triangular prism, hexagonal prism, or cylinder. When regularly arranging fine particles, the symmetry of the shape can be increased. To improve the arrangement properties during coating, the particle size dispersion can be decreased. When using fine particles in an HDD medium, the particle size dispersion can be set at, for example, 20% or less, and can also be set at 15% or less. When the particle size dispersion is low, the jitter noise of the HDD medium can be reduced. If the dispersion exceeds 20%, there is no merit of the particle size dispersion when compared to conventional media manufacturing by sputtering.

As the material of the fine particles, it is possible to use a metal, an inorganic material, or a compound thereof. Practical examples of the material are Al, Si, Ti, V, Cr, Mn, Fe, Co, Ni, Zn, Y, Zr, Sn, Mo, Ta, and W, and oxides, nitrides, borides, carbides, and sulfides of these materials. The fine particles can be either crystalline or amorphous.

The fine particles to be used in the embodiments contain the above-mentioned materials on at least their surfaces. For example, it is possible to use a core-shell fine particle such as a structure in which Fe is covered with $FeO_x$ (x=1 to 1.5). When using the core-shell fine particle, it is possible to use materials having different compositions, such as a structure in which $Fe_3O_4$ is covered with $SiO_2$. When a main component is one of the above-mentioned materials, it is possible to use a compound containing a noble metal such as Pt or Ag, for example, $Fe_{50}Pt_{50}$. If the ratio of the noble metal exceeds 50%, however, it becomes difficult to bond the protective group, so a ratio like this is inadequate.

Since the fine particles are arranged in a solution system, the fine particles are used as they are stably dispersed in a solution while two types of protective groups (described later) are attached to them.

<First Additive>

In the embodiments, the first protective group is attached to the fine particles in order to improve the coating properties and adhesion of the fine particles on their surfaces to which the fine particle coating solution is applied. A material that functions as the first protective group after being adhered to the fine particles will be called a "first additive". The first additive contains a functional group to be bonded to the fine particles. Examples of this functional group are an amino group, carboxy group, hydroxy group, and sulfo group. A strong bond can be obtained when the functional group bonds to the surface of the fine particle. In particular, a carboxy group can strongly react with the surface of the fine particle.

As a main chain of the first additive, it is possible to use saturated or unsaturated hydrocarbon, or saturated or unsaturated hydrocarbon partially substituted by O, N, S, or P. Examples of the saturated hydrocarbon are capric acid, lauric acid, palmitic acid, and stearic acid. Examples of the unsaturated hydrocarbon are palmitoleic acid, oleic acid, linoleic acid, and linolenic acid. Also, examples of the main chain are polymers such as polyester, polyethylene, epoxy, polyurethane, polyacrylate, polymethacrylate, polystyrene, and polypropyrene. When the first additive has a side chain, if this side chain is very large (for example, if the side chain has a few hundred atomic groups), the side chain behaves as steric and makes it difficult for the reaction with the fine particle surface to advance. The first additive can have a similar main chain for an amino group, hydroxy group, and sulfo group. Examples are oleylamine, polystyrene having a hydroxy group at its terminal end, and polymethylmethacrylate having a sulfo group at its terminal end.

The coating properties and adhesion to the substrate can be defined by a solubility parameter (SP value). A low SP value is suited when the substrate surface is hydrophobic. A high SP value is favorable when the substrate surface is hydrophilic. For example, when the substrate surface is C, octanoic acid having a high SP value is repelled by the substrate, so it is difficult to coat the substrate with this acid. When the SP value is decreased to about that of stearic acid, however, the substrate can well be coated with the acid. From these results, a usable SP value is 15 to 24 $(MPa)^{1/2}$.

In the first additive, the particle spacing can be changed by the molecular weight. For example, the particle spacing is approximately 2 nm when using stearic acid ($C_{18}H_{36}O_2$), and is approximately 3 nm when using octadocosanoic acid ($C_{28}H_{56}O_2$). If the particle spacing is too widen, the interaction weakens, and the particles are not regularly arranged. The number of Cs (or Os, Ns, Ss, or Ps) of the main chain can be set between about 15 and 1,000.

<Second Additive>

In the embodiments, a second protective group is attached to the fine particles in order to strengthen the bond between the fine particles and the substrate to which the fine particle coating solution is applied. A material that functions as the second protective group after being adhered to the particles will be called a "second additive".

The second additive contains two groups. One group is a functional group to be bonded to the fine particles, like that of the first additive. Examples of this functional group are an amino group, carboxy group, hydroxy group, and sulfo group. A strong bond is obtained when the functional group bonds to the surface of the fine particle.

The functional group used in the second additive and that used in the first additive can be the same or different.

The other group is a polymerizable functional group that polymerizes by light or heat. Typical polymerizable functional groups usable in the embodiments are an acryloyl group, methacryloyl group, epoxy group, oxetane ring, and vinylether group. When any of these groups is contained, a polymerization reaction between the protective groups is promoted by light or heat, so the protective groups can be cured. When the protective groups are cured, it is possible to prevent aggregation of particles in a subsequent process.

Like the first additive, the second additive can have a main chain such as saturated hydrocarbon, unsaturated hydrocarbon, polyester, polyurethane, polyethylene, or epoxy. Examples of a protective group like this are polyester acrylate and polyurethane acrylate. It is also possible to use a protective group obtained by substituting the terminal end of carboxylic acid with acrylate. Examples are acryloyloxyethyl-succinic acid, methacryloyloxyethyl-succinic acid, and acryloyloxyethyl-phthalic acid.

Since the second additive has the functional group as described above, the SP value of the second additive is generally higher than that of the first additive. When conditions under which the first and second additives simultaneously dissolve are met, it is possible to sufficiently disperse the fine particles in the solvent. Accordingly, the SP value of the second additive can be set between 18 $(MPa)^{1/2}$ and 25 $(MPa)^{1/2}$.

If the SP value of the second additive is less than 18 $(MPa)^{1/2}$, groups necessary for the polymerization reaction are often reduced. If the SP value of the second additive is higher than 25 $(MPa)^{1/2}$, the wettability to the substrate often worsens.

<Mixing of First and Second Additives>

It is necessary to mix the first and second additives and cause them to sufficiently react with each other before coating the fine particles. The fine particles can be synthesized in a state of a pure metal or in a state in which the valence of oxidation has a margin, and can be caused to react with the first and second additives as oxidation advances. This will be explained by taking an additive having a carboxy group as an example. For example, Fe particles are synthesized in a state in which an oleylamine protective group is attached in an Ar ambient. The Fe particles to which the oleylamine protective group is thus attached react with the first and second additives as follows. In the atmosphere, oleylamine comes off when Fe oxidizes, and an oxidation layer is formed on the surface. When the first and second additives are mixed and allowed to react with each other before oxidation completely occurs, the surfaces of the Fe particles can strongly be bonded to the oxidizer. The first and second additives can be dissolved in the same solvent as that used to disperse the fine particles or in a solvent having a close SP value, and can be mixed in the dispersion of the fine particles. After the mixing, the projective groups are substituted over a reaction time of a few minutes to a few hours. Note that "substitution" herein mentioned means a state in which a phenomenon in which the protective groups oxidize and naturally come off during the synthesis of the fine particles and a phenomenon in which the first and second additives react with and bond to the fine particle surfaces almost simultaneously occur, so the protective groups look as if they are interchanged. While the protective groups are substituted, the dispersion may also be placed under stirring or ultrasonic vibration. After the protective groups are substituted, the protective groups existing during the synthesis can be removed. In an additive having an amino group, the group comes off when the particle surface oxidizes. In this case, coating is performed in an ambient in which the oxygen amount is small. No problem arises when an amino group comes off after coating and curing. A hydroxy group is caused to react with the particle surface by heating. A sulfo group is caused to react in the same manner as that for a carboxy group.

<Solvent>

As the solvent for dispersing the fine particles, it is possible to use a solvent having a high affinity to the above-described particle protective groups. Since the solution is subjected to coating, it is possible to use not a water-based solvent but an organic solvent. For example, hydrochloric acid is inadequate because it dissolves metal particles. The SP value can be set within the range from a lower SP value of the first and second additives −5 to a higher SP value thereof +5, and can further be set between the first and second additives. When using a method such as spin coating, the volatility of the solvent can be higher, and the boiling point of the solvent can be set at 200° C. or less, and can also be set at 160° C. or less.

Examples are aromatic hydrocarbon, alcohol, ester, ether, ketone, glycol ether, alicyclic hydrocarbon, and aliphatic hydrocarbon. From the viewpoints of the boiling point and coating properties, it is possible to use, for example, hexane, toluene, xylene, cyclohexane, cyclohexanone, PGMEA, ethyl lactate, butyl lactate, methylethylketone, or allyl acetate.

<Coating Method of Fine Particles>

The substrate is coated with the fine particles by using, for example, a spin coating method, dip coating method, or LB method. In the spin coating method, the fine particle dispersion having an adjusted concentration is dropped on the substrate, and the solvent is dried by rotating the substrate. Since the film thickness can be controlled by the rotational speed, a fine particle monolayer can easily be formed. In the dip coating method, the substrate is dipped in the dispersion, and the fine particles are adhered to the substrate by the viscous force and intermolecular force when the substrate is pulled up. The film thickness is controlled by the pulling rate. In the LB method, the polarity of the particle protective group and that of the solvent are dissociated from each other to make a state in which a monolayer of fine particles floats on the surface. After that, the fine particles are arranged on the substrate by pulling up the dipped substrate.

<Curing Method>

The protective group can be cured by radiating general UV light. The UV light is light having a wavelength of 200 to 400 nm. For example, the second additive thinly protecting the fine particles can be cured by radiating a UV lamp of 10 to 100 $mW/cm^2$ for about a few tens of seconds. When using a radical polymerization mechanism during curing, it is desirable to perform curing in a vacuum or in a state in which a protective layer is formed so as to prevent oxygen from entering and inhibiting curing.

It is also possible to cure the protective group by heating. For example, the protective group can be cured by performing heating at 150° C. for about 1 hour in an oven containing an $N_2$ ambient.

<Hard Mask>

A hard mask layer can be formed between the substrate and fine particles as needed. When the hard mask layer is formed, it is possible to secure a mask height and taper a pattern.

The hard mask is formed by depositing a film including at least one layer on a recording layer by a method such as sputtering. When the hard mask must have a height to some extent, it is favorable to give the hard mask a structure including two or more layers. For example, a mask having a high aspect can be formed by using C as a lower layer and Si as an upper layer. Alternatively, when using a metal such as Ta, Ti, Mo, or W or a compound thereof as the lower layer, a material such as Ni or Cr can be used as the upper layer. The use of a metal material as the mask has the advantage that the deposition rate increases.

When using the hard mask as an ion milling hard mask, C, Ta, Ti, or a compound thereof is used as the hard mask. When using the hard mask not as an etching mask but a pattern layer for depositing a magnetic film on it, it is possible to use Al, Fe, Ni, or Sn on the surface of which a oxidation film is formed, a noble metal such as Au, Ag, Pt, Pd, or Ru that hardly oxidizes, or a material such as C or Si.

<Patterning of Hard Mask>

The hard mask can be patterned by using various dry etching processes as needed. For example, when the hard mask is C, dry etching can be performed by using an oxygen-based gas such as $O_2$ or $O_3$ or a gas such as $H_2$ or $N_2$. When the hard mask is Si, Ta, Ti, Mo, or W, RIE can be performed by using a halogen gas ($CF_4$, $CF_4/O_2$, $CHF_3$, $SF_6$, or $Cl_2$). When using a compound of Cr or Al as the hard mask, RIE using a Cl-based gas can be performed. Also, ion milling using a rare gas is effective when using a noble metal such as Au, Pt, Pd, or Cu.

<Patterning of Magnetic Recording Layer>

In the patterning of the magnetic recording layer, patterns are formed by projections and recesses on the recording layer by etching unmasked portions by ion milling or RIE. "Patterns are formed by projections and recesses" normally means that the material of the recording layer is entirely etched. In some cases, it is also possible to form a structure in which the material of the recording layer is partially left behind in the recesses, or a structure such as a capped structure in which the first layer is entirely etched and layers from the second layer are left behind.

In ion milling, it is possible to use a rare gas such as Ne, Ar, Kr, or Xe, or an inert gas such as $N_2$. When using RIE, a gas such as a $Cl_2$-based gas, $CH_3OH$, or $NH_3+CO$ is used. RIE sometimes requires $H_2$ gas cleaning, baking, or washing after etching.

<Filling Step>

A process of planarizing the magnetic recording layer processed into periodic patterns by filling can be added to the magnetic recording medium according to the embodiment. As this filling, sputtering using a filling material as a target is used because the method is simple. However, it is also possible to use, for example, plating, ion beam deposition, chemical vapor deposition (CVD), or ALD. When using CVD or ALD, the filling material can be deposited at a high rate on the sidewalls of the highly tapered magnetic recording layer. Also, high-aspect patterns can be filled without any gap by applying a bias to the substrate during filling deposition. It is also possible to use a method by which a so-called resist such as spin-on-glass (SOG) or spin-on-carbon (SOC) is formed by spin coating and cured by annealing.

$SiO_2$ can be used as the filling material often found in well-known examples. However, the filling material is not limited to this, and can be any material as long as the hardness and flatness are allowable. For example, an amorphous metal such as NiTa or NiNbTi can be used as the filling material because the amorphous metal is easy to planarize. A material such as $CN_x$ or $CH_x$ mainly containing C can be also used because the material has high hardness and high adhesion to diamond-like carbon (DLC). An oxide or nitride such as $SiO_2$, $SiN_x$, $TiO_x$, or $TaO_x$ is also usable as the filling material. However, if the filling material forms a reaction product together with the magnetic recording layer when brought into contact with the magnetic recording layer, a protective layer can be sandwiched between the filling layer and magnetic recording layer.

<Protective Film Formation and Post-Process>

The carbon protective film is desirably deposited by CVD in order to improve the coverage for the three-dimensional structure. However, the protective film can also be deposited by sputtering or vacuum deposition. A DLC film containing a large amount of $sp^3$-bonded carbon is formed by CVD. If the film thickness is 2 nm or less, the coverage worsens. If the film thickness is 10 nm or more, the magnetic spacing between a recording/reproduction head and the medium increases, and the signal-to-noise ratio (SNR) often decreases. The protective film can be coated with a lubricant. As the lubricant, it is possible to use, for example, perfluoropolyether, alcohol fluoride, or fluorinated carboxylic acid.

<Magnetic Recording Layer>

When using alloy-based materials, the magnetic recording layer can contain Co, Fe, or Ni as a main component, and can additionally contain Pt or Pd. The magnetic recording layer can also contain Cr or an oxide as needed. As the oxide, silicon oxide or titanium oxide is particularly usable. In addition to the oxide, the magnetic recording layer can further contain one or more elements selected from Ru, Mn, B, Ta, Cu, and Pd. These elements can improve the crystallinity and orientation, and make it possible to obtain recording/reproduction characteristics and thermal decay characteristics for high-density recording.

As the perpendicular magnetic recording layer, it is possible to use a CoPt-based alloy, an FePt-based alloy, a CoCrPt-based alloy, an FePtCr-based alloy, CoPtO, FePtO, CoPtCrO, FePtCrO, CoPtSi, FePtSi, and a multilayered structure including Co, Fe, or Ni and an alloy mainly containing at least one element selected from the group consisting of Pt, Pd, Ag, and Cu. It is also possible to use an MnAl alloy, SmCo alloy, FeNbB alloy, or CrPt alloy having a high Ku.

The thickness of the perpendicular magnetic recording layer can be 3 to 30 nm, and can also be 5 to 15 nm. When the thickness falls within this range, it is possible to manufacture a magnetic recording/reproduction apparatus for a high recording density. If the thickness of the perpendicular magnetic recording layer is less than 3 nm, the reproduced output is too low, and the noise component often becomes higher. If the thickness of the perpendicular magnetic recording layer exceeds 30 nm, the reproduced output often becomes too high and distorts the waveform.

<Interlayer>

An interlayer made of a nonmagnetic material can be formed between a soft under layer and the recording layer. The interlayer has two functions, i.e., interrupts the exchange coupling interaction between the soft under layer and recording layer, and controls the crystallinity of the recording layer. Examples of the material of the interlayer are Ru, Pt, Pd, W, Ti, Ta, Cr, Si, Ni, Mg, and alloys, oxides, and nitrides thereof.

<Soft Under Layer>

The soft under layer (SUL) horizontally passes a recording magnetic field from a single-pole head for magnetizing the perpendicular magnetic recording layer, and returns the magnetic field toward the magnetic head, i.e., performs a part of the function of the magnetic head. The soft under layer has a function of applying a steep sufficient perpendicular magnetic field to the recording layer, thereby increasing the recording/reproduction efficiency. A material containing Fe, Ni, or Co can be used as the soft under layer. Examples of the material of the soft under layer are FeCo-based alloys such as FeCo and FeCoV, FeNi-based alloys such as FeNi, FeNiMo, FeNiCr, and FeNiSi, FeAl-based and FeSi-based alloys such as FeAl, FeAlSi, FeAlSiCr, FeAlSiTiRu, and FeAlO, FeTa-based alloys such as FeTa, FeTaC, and FeTaN, and FeZr-based alloys such as FeZrN. It is also possible to use a material having a microcrystalline structure or a granular structure in which fine crystal grains are dispersed in a matrix. Examples are FeAlO, FeMgO, FeTaN, and FeZrN containing 60 at % or more of Fe. Other examples of the material of the soft under layer are Co alloys containing Co and at least one of Zr, Hf, Nb, Ta, Ti, and Y. The Co alloy can contain 80 at % or more of Co. When the Co alloy like this is deposited by sputtering, an amorphous layer readily forms. The amorphous soft magnetic material has none of magnetocrystalline anisotropy, a crystal defect, and a grain boundary, and hence has very high soft magnetism and can reduce the noise of the medium. Examples of a usable amorphous soft magnetic material are CoZr-, CoZrNb-, and CoZrTa-based alloys.

It is also possible to additionally form a base layer below the soft under layer, in order to improve the crystallinity of the soft under layer or improve the adhesion to the substrate. As the material of this base layer, it is possible to use Ti, Ta, W, Cr, Pt, an alloy containing any of these elements, or an oxide or nitride of any of these elements.

In order to prevent spike noise, it is possible to divide the soft under layer into a plurality of layers, and insert 0.5- to 1.5-nm-thick Ru, thereby causing antiferromagnetic coupling between them. The soft magnetic layer may also be exchange-coupled with a hard magnetic film having in-plane anisotropy such as CoCrPt, SmCo, or FePt, or a pinned layer made of an antiferromagnetic material such as IrMn or PtMn. To control the exchange coupling force, it is possible to stack magnetic films such as Co or nonmagnetic films such as Pt on the upper and lower surfaces of the Ru layer.

FIG. 1 is a view showing an example of a periodic pattern formable by the method according to the embodiment.

As shown in FIG. 1, when using the method according to the embodiment, a pattern in which, for example, fine particles 20 are hexagonally closely packed at a pitch of a few nanometers to a few tens of nanometers can be formed at once in a large area.

FIG. 2 is a view showing another example of the periodic pattern formable by the method according to the embodiment.

In the periodic pattern of this example, fine particles 21 form a square array. This pattern can be formed when the shape of fine particles used is a cube.

FIG. 3 is a partially exploded perspective view showing an example of a magnetic recording/reproduction apparatus to which the magnetic recording medium according to the embodiment is applicable.

As shown in FIG. 3, a magnetic recording/reproduction apparatus 130 includes a rectangular boxy housing 131 having an open upper end, and a top cover (not shown) that is screwed to the housing 131 by a plurality of screws and closes the upper-end opening of the housing.

The housing 131 houses, for example, a magnetic recording medium 132 according to the embodiment, a spindle motor 133 as a driving means for supporting and rotating the magnetic recording medium 132, a magnetic head 134 for recording and reproducing magnetic signals with respect to the magnetic recording medium 132, a head actuator 135 that has a suspension on the distal end of which the magnetic head 134 is mounted, and supports the magnetic head 134 such that it can freely move with respect to the magnetic recording medium 132, a rotating shaft 136 for rotatably supporting the head actuator 135, a voice coil motor 137 for rotating and positioning the head actuator 135 via the rotating shaft 136, and a head amplifier circuit board 138.

The embodiments will be explained in more detail below by way of their examples.

Example 1

FIG. 4 is a flowchart showing a method of forming a periodic pattern to be used in the first embodiment.

First, an Fe fine particle dispersion was prepared by dispersing 1 wt % of Fe fine particles (particle size=10 nm) having an oleylamine protective group in toluene (step BL1).

Subsequently, 1 wt % of stearic acid as a first additive and 1 wt % of carboxy group-containing polyester acrylate as a second additive were dispersed in a toluene solvent, and the dispersion was mixed with the Fe fine particle dispersion at a weight ratio of 1:1. After that, the mixture was stirred in the atmosphere for 1 hour, thereby obtaining a fine particle coating solution (step BL2).

The fine particle coating solution was dropped on a glass substrate on which a magnetic recording layer forming a magnetic recording medium and a mask layer were deposited, and spin coating was performed at a rotational speed of 3,000 rpm, thereby forming a fine particle monolayer (step BL3), and forming a periodic pattern including the substrate and fine particle layer (step BL4).

The glass substrate was left to stand in a vacuum UV exposure apparatus, and irradiated with UV light having a wavelength of 300 nm at 5 mW/cm$^2$ for 200 seconds. By this UV irradiation, acrylate of the protective group cured and strongly supported the particles, thereby forming a regular array pattern by the fine particle layer and a protective layer buried around the fine particle layer. It was confirmed by SEM observation that the fine particles were arranged into a monolayer on the substrate.

FIGS. 5A, 5B, 5C, 5D, and 5E are exemplary sectional views showing steps of forming a patterned magnetic recording medium by using the above-mentioned periodic pattern.

Subsequently, the periodic pattern was transferred to the magnetic recording layer.

Note that the film configuration of the magnetic recording medium having the magnetic recording layer to which the periodic pattern was to be transferred included a 40-nm-thick soft magnetic layer (CoZrNb) (not shown), 20-nm-thick Ru orientation control interlayer 2, 10-nm-thick $Co_{80}Pt_{20}$ magnetic recording layer 3, 2-nm-thick Pd protective film 4, 3-nm-thick Mo liftoff layer 5, and 10-nm-thick first hard mask layer 6 made of C stacked in this order on a glass substrate 1.

First, FIG. 5A shows a state in which the regular array pattern including a fine particle layer 7 and a protective layer 8 buried around the fine particle layer 7 was formed on the first hard mask layer 6.

Figure 5B:
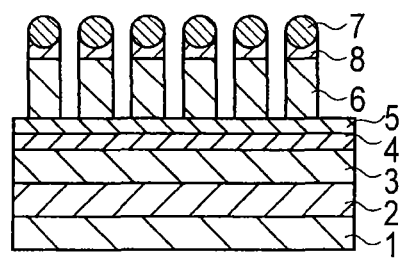

As shown in FIG. 5B, the pattern of the Fe fine particle layer 7 was transferred to the C mask 6 by dry etching. For example, this step was performed for an etching time of 30 seconds by an inductively-coupled plasma (ICP) RIE apparatus by using $O_2$ as a process gas at a chamber pressure of 0.1 Pa, a coil RF power of 100 W, and a platen RF power of 10 W. Since the Fe particles are hardly etched by $O_2$ plasma, the mask was formed such that the Fe particle (the surface was oxidized by plasma) having a diameter of 10 nm was placed on a C pillar having a height of 10 nm.

Figure 5C:
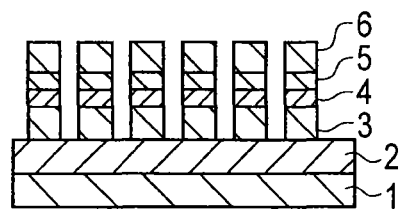

Then, as shown in FIG. 5C, the shape of the first hard mask C was transferred to the magnetic recording layer 3 by ion milling. For example, this step was performed for an etching time of 20 seconds by an Ar ion milling apparatus by using Ar as a process gas at a chamber pressure of 0.04 Pa, a plasma power of 400 W, and an acceleration voltage of 400 V. In this step, the Mo liftoff layer 5, Pd protective layer 4, and CoPt magnetic recording layer 3 were etched, and the CoPt recording layer 3 was magnetically divided.

Figure 5D:
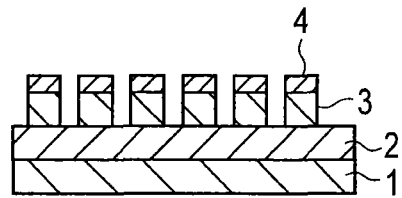

Subsequently, as shown in FIG. 5D, the first hard mask 6 was removed together with the liftoff layer 5 made of Mo. For example, this step was performed by dipping the medium in a hydrogen peroxide solution having a concentration of 0.1%, and holding the medium in it for 5 minutes.

Figure 5E:
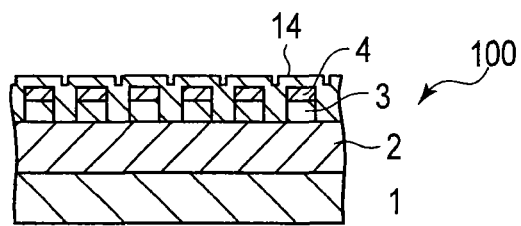

Finally, as shown in FIG. 5E, a 5-nm-thick second protective film 14 made of DLC was formed by CVD and coated with a lubricant, thereby obtaining a patterned medium 100 according to the first embodiment.

When the planar structure of the patterned medium manufactured by the method as described above was observed with an SEM, the dispersion of the CoPt particle sizes was 10%.

Also, the manufactured magnetic recording medium was incorporated into a drive, and the SNR was measured. Consequently, the SNR was 10 dB at a recording density of 500 kFCI, i.e., the manufactured medium was usable as a magnetic recording medium.

This result shows that a patterned magnetic recording medium having a periodic pattern in which the size distribution of magnetic particles is low and the in-plane uniformity is high can be obtained from the periodic pattern of the fine particle layer formed by the embodiment.

Example 2

Figure 6:
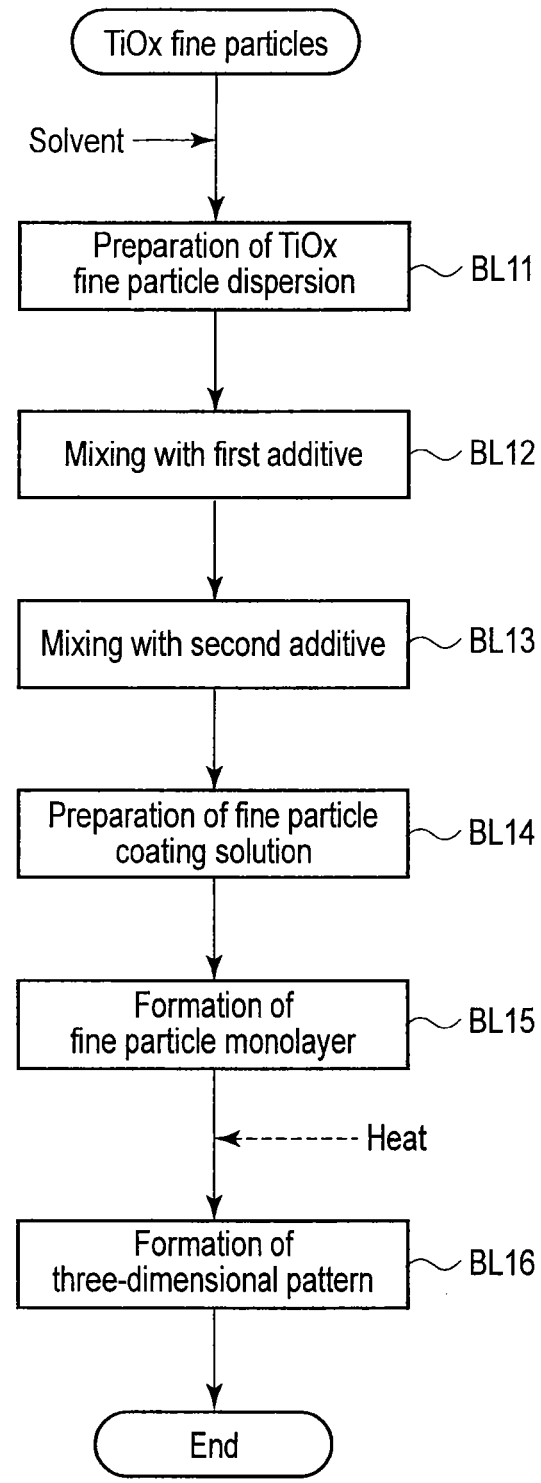
FIG. 6 is a flowchart showing a method of forming a periodic pattern to be used in the second embodiment.

FIG. 6 is a flowchart showing a method of forming a periodic pattern to be used in the second embodiment.

First, as shown in FIG. 6, an $TiO_x$ fine particle dispersion was prepared by dispersing 10 wt % of $TiO_x$ fine particles having a particle size of 8 nm in an ethanol solvent (step BL11).

1 wt % of stearic acid as a first additive was dispersed in a propylene glycol 1-monomethyl ether 2-acetate (PGMEA) solvent. The $TiO_x$ fine particles were mixed in the solution, the mixture was stirred in the atmosphere for 1 hour, and the solvent was entirely replaced with PGMEA (step BL12).

Then, 1 wt % of carboxy-group-containing polyester methacrylate having a molecular weight of about 300 was dispersed in the PGMEA solvent, and the dispersion was mixed with the $TiO_x$ particle dispersion at a weight ratio of 3:1 (step BL13). A fine particle coating solution was obtained by stirring the mixture in the atmosphere for 1 hour (step BL14).

The $TiO_x$ particle dispersion was dropped on a glass substrate on which a soft magnetic layer was deposited, and spin coating was performed at a rotational speed of 3,000 rpm, thereby arranging the fine particles into a monolayer (step BL15).

The substrate was left to stand in a clean oven, and baked at 150° C. for 1 hour. By this heating process, methacrylate of the protective group cured and strongly supported the particles, thereby forming a periodic pattern by the fine particle layer (step BL16). It was confirmed by SEM observation that the particles were arranged into a monolayer on the substrate.

FIGS. 7A, 7B, 7C, and 7D are exemplary sectional views showing steps of forming a patterned magnetic recording medium by using the above-mentioned periodic pattern.

Note that the configuration of the multilayered structure including a layer to which the fine particle coating solution was to be applied included a 40-nm-thick CoZrNb soft magnetic layer 11 and 5-nm-thick SiC surface oxidation protective layer 12 stacked in this order on a glass substrate 1.

Figure 7A:
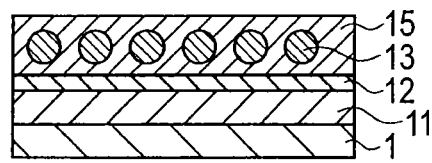
FIGS. 7A, 7B, 7C, and 7D are exemplary sectional views showing steps of forming a magnetic recording medium according to the second embodiment.

First, FIG. 7A shows a state in which a periodic pattern including a fine particle layer 13 and protective layer 15 was formed on the soft magnetic layer 11 and SiC surface oxidation protective layer 12.

Figure 7B:
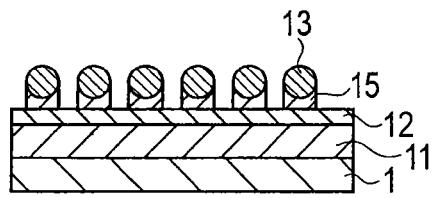

As shown in FIG. 7B, methacrylate 15 around $TiO_x$ particles 13 was etched by dry etching, thereby isolating the particles. For example, this step was performed for an etching time of 10 seconds by an inductively-coupled plasma (ICP) RIE apparatus by using $O_2$ as a process gas at a chamber pressure of 0.1 Pa, a coil RF power of 100 W, and a platen RF power of 10 W. Since the $TiO_x$ particles 13 are hardly etched by plasma, a pillar-like structure in which the $TiO_x$ particle was supported by methacrylate was obtained. This etching stopped when methacrylate was removed from the particle sidewalls and SiC as the protective layer 12 of the soft magnetic layer 11 was exposed.

Figure 7C:
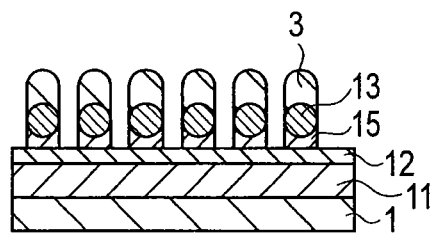

Subsequently, as shown in FIG. 7C, a magnetic recording layer 3 was deposited on the surfaces of the $TiO_x$ particles 13 by sputtering. First, a 3-nm-thick Ru layer (not shown) for controlling the crystal orientation was stacked, and the magnetic recording layer 3 (total thickness=10 nm) having an artificial lattice obtained by stacking 10 layers of [Co (0.3 nm)/Pt (0.7 nm)] was stacked after that.

Figure 7D:
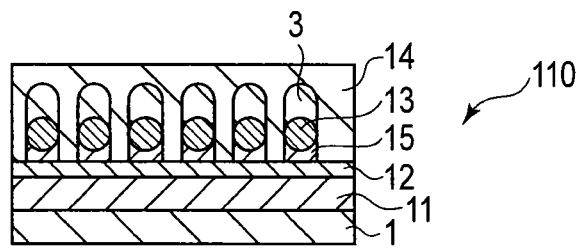

Finally, as shown in FIG. 7D, a 5-nm-thick second protective film 14 made of DLC was formed by CVD and coated with a lubricant, thereby obtaining a patterned medium 110 according to the second embodiment.

When the planar structure of the patterned medium manufactured by the method as described above was observed with an SEM, the dispersion of the CoPt particle sizes was 10%. The manufactured magnetic recording medium was incorporated into a drive, and the SNR was measured. Consequently, the SNR was 9 dB at a recording density of 500 kFCI, i.e., the manufactured medium was usable as a magnetic recording medium. This result shows that a magnetic recording medium in which the size distribution of magnetic particles is low can be obtained from the micropattern of the present invention.

Example 3

FIGS. 8A, 8B, 8C, 8D, and 8E are exemplary sectional views showing steps of manufacturing a patterned magnetic recording medium according to the third embodiment.

A fine particle coating solution was prepared in the same manner as in Example 1.

The configuration of a multilayered structure including a layer to which the fine particle coating solution was to be applied included a 40-nm-thick CoZrNb soft magnetic layer 11, 5-nm-thick CrTi oxidation protective layer (not shown), and 5-nm-thick three-dimensional structure formation underlayer 16 made of C stacked in this order on a glass substrate 1.

Figure 8A:
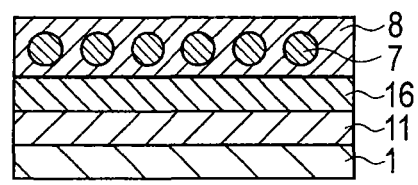
FIGS. 8A, 8B, 8C, 8D, and 8E are exemplary sectional views showing steps of forming a magnetic recording medium according to the third embodiment.

As shown in FIG. 8A, a periodic pattern including a fine particle layer 7 and protective layer 8 was formed on the three-dimensional structure formation underlayer 16 in the same manner as in Example 1.

Figure 8B:
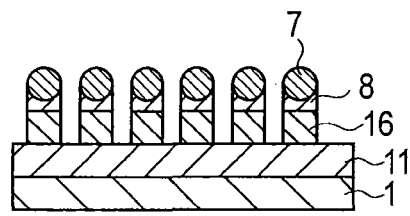

Then, as shown in FIG. 8B, the pattern of the Fe particles 7 were transferred to the C underlayer 16 by dry etching.

For example, this step was performed for an etching time of 15 seconds by an inductively-coupled plasma (ICP) RIE apparatus by using $O_2$ as a process gas at a chamber pressure of 0.1 Pa, a coil RF power of 100 W, and a platen RF power of 10 W. Since the Fe particles are hardly etched by $O_2$ plasma, a mask in which the Fe particle (the surface was oxidized by plasma) having a diameter of 10 nm was placed on a 5-nm-thick C pillar 16 was obtained.

Figure 8C:
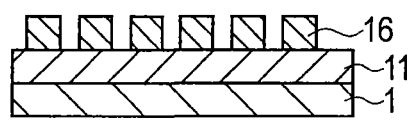

Subsequently, as shown in FIG. 8C, the Fe particles 7 were dissolved away to form a structure including only the C pillars 16. For example, this step was performed by dipping the substrate in an aqueous HCl solution having a concentration of 1 wt % for 5 minutes, thereby selectively dissolving the oxidized Fe particles 7 on the surface. The soft magnetic layer 11 was not dissolved because it was protected by the CrTi protective film.

Figure 8D:
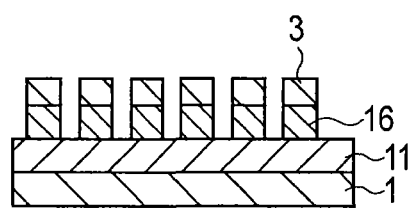

After that, as shown in FIG. 8D, a magnetic recording layer 3 was deposited on the surfaces of the C pillars 16 by sputtering. First, a 3-nm-thick Ru layer (not shown) for controlling the crystal orientation was stacked, and the magnetic recording layer 3 (total thickness=10 nm) having an artificial lattice obtained by stacking 10 layers of [Co (0.3 nm)/Pt (0.7 nm)] was stacked after that.

Figure 8E:
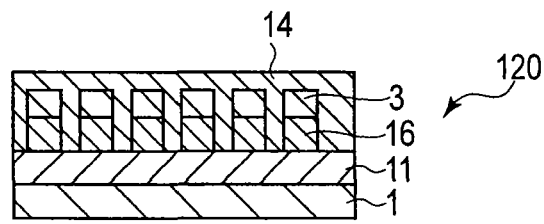

Finally, as shown in FIG. 8E, a 5-nm-thick second protective film 14 made of DLC was formed by CVD and coated with a lubricant, thereby obtaining a patterned medium 120 according to the third embodiment.

When the planar structure of the patterned medium manufactured by the method as described above was observed with an SEM, the dispersion of the [CoPt] particle sizes was 10%. This result shows that a magnetic recording medium in which the size distribution of the magnetic particles is low can be obtained from a micropattern by the third embodiment. The manufactured magnetic recording medium was incorporated into a drive, and the SNR was measured. Consequently, the SNR was 8 dB at a recording density of 500 kFCl, i.e., the manufactured medium was usable as a magnetic recording medium. This result shows that a magnetic recording medium having a periodic pattern in which the size distribution is low and the in-plane uniformity is high can be obtained from the micropattern of the present invention.

Example 4

Whether it was possible to suppress aggregation of fine particles by the periodic pattern formation method of Example 1 was checked by using Al, Si, Ti, V, Cr, Mn, Fe, Co, Ni, Zn, Y, Zr, Sn, Mo, Ta, and W as the fine particles.

Following the same procedures as in Example 1, carboxy-group-containing polyester acrylate was mixed in a fine particle dispersion, and a substrate was coated with a monolayer of the mixture. After that, an RIE process was performed, and the presence/absence of aggregation was checked by a planar SEM. Au fine particles were used as Comparative Example 4-1.

Table 1 below shows the obtained results.

Although each material can be either an oxide or pure metal, some materials are listed as oxides in examples.

An oxide of metal material A is represented by $AO_x$ (x changes in accordance with the material, but $0<x\leq3$ holds in most cases) when the valence is not particularly designated.

Also, the same effect as that of Example 4 is obtained even by a core-shell structure in which the material of Example 4 covers another material (for example, a noble metal) as in Example 4-17.

TABLE 1

| | Material | Diameter | Aggregation suppression |
|---|---|---|---|
| Example 4-1 | Fe | 10 nm | ○ |
| Example 4-2 | $AlO_x$ | 13 nm | ○ |
| Example 4-3 | Si | 10 nm | ○ |
| Example 4-4 | $TiO_x$ | 25 nm | ○ |
| Example 4-5 | $VO_x$ | 10 nm | ○ |
| Example 4-6 | $CrO_x$ | 20 nm | ○ |
| Example 4-7 | Mn | 30 nm | ○ |
| Example 4-8 | Co | 50 nm | ○ |
| Example 4-9 | Ni | 10 nm | ○ |
| Example 4-10 | Zn | 50 nm | ○ |
| Example 4-11 | $YO_x$ | 50 nm | ○ |
| Example 4-12 | $ZrO_x$ | 100 nm | ○ |
| Example 4-13 | Sn | 100 nm | ○ |
| Example 4-14 | Mo | 100 nm | ○ |
| Example 4-15 | Ta | 25 nm | ○ |
| Example 4-16 | $WO_x$ | 100 nm | ○ |
| Example 4-17 | FePt(core)/$FeO_x$ (shell) | 10 nm | ○ |
| Comparative Example 4-1 | Au | 8 nm | X |

In Table 1, ○ indicates a sample in which adhesion of particles was not found in an image obtained at a magnification of ×200,000 by SEM observation, and X indicates a sample in which adhesion of particles was found. Adhesion of particles indicates that the particles have moved from a state after coating, and means that the particles have aggregated.

No aggregation was found among the particles of Example 4 after coating and RIE.

This result reveals that, like Fe particles, the surface of each particle reacted with the carboxy group of acrylate, and an effect of preventing aggregation during the process was obtained.

On the other hand, Au particles tried as Comparative Example 4-1 aggregated and precipitated with the elapse of time. This was so because the Au particles and acrylate did not react with each other but separated from each other.

The above results demonstrate that the aggregation suppression effect was found for the particles disclosed in this example.

Example 5

The method according to the embodiment improves both the coating properties and the adhesion to a substrate by adding two types of additives to fine particles.

Fe fine particles were used as the fine particles, and polyester acrylate having a carboxy group at its terminal end was used as a second additive. Following the same procedures as in Example 1, a fine particle coating solution was prepared by changing a first additive as shown in Table 2 below. Table 2 below also shows the weight ratio of the Fe fine particles to the first additive.

A C substrate was coated with the obtained fine particle coating solution, and the solution was cured by UV exposure in the same manner as in Example 1.

The coating properties were evaluated by SEM observation.

Table 2 below shows the obtained results.

TABLE 2

| | Material | Solvent | Fe:First additive (weight ratio) | Coating |
|---|---|---|---|---|
| Example 5-1 | Stearic acid | PGMEA | 1:5 | ◎ |
| Example 5-2 | Octadocosanoic acid | Hexane | 1:1 | ◎ |
| Example 5-3 | Oleic acid | Toluene | 10:1 | ○ |
| Example 5-4 | Dodecane sulfonic acid | Ethyl lactate | 1:1 | ○ |
| Comparative Example 5-1 | None | Toluene | None | X |

Note that in Table 2, a double circle indicates a sample in which a regular array was formed with no coating unevenness in an image obtained at a magnification of ×200,000 by SEM observation, ○ indicates a sample having one or more defects, Δ indicates a sample having three or more defects, and X indicates a sample having five or more defects.

When using the first additive, defects were fewer than those when using no first additive (a comparative example), and even coating was possible. This result reveals that the use of the first additive improved the coating properties to the substrate.

Example 6

Fe fine particles were used as the fine particles, and stearic acid was used as the first additive. Following the same procedures as in Example 1, a fine particle coating solution was prepared by changing the second additive as shown in Table 3 below.

A C substrate was coated with the obtained fine particle coating solution, and the solution was cured by using a suitable one of UV and heat in accordance with the material.

The aggregation suppression effect was checked by etching the C substrate by using the particles as masks by RIE using $O_2$ gas.

After the process, samples were observed in a viewing field of ×200,000 of a planar SEM, and evaluated. A double circle indicates a sample having 10 or less aggregations, ○ indicates a sample having 20 or less aggregations, Δ indicates a sample having 50 or less aggregations, and X indicates a sample having more than 50 aggregations.

Table 3 below shows the obtained results.

TABLE 3

| | Main chain | Molecular weight | Viscosity (mPa·s) | Curing | Aggregation suppression |
|---|---|---|---|---|---|
| Example 6-1 | Polyester acrylate having carboxy group at terminal end | 1000 | 100 | UV | ⊚ |
| Example 6-2 | 2-methacryloyloxyethyl phthalic acid | 278 | 3800 | Heat | ○ |
| Example 6-3 | Polymethylmethacrylate having carboxy group at terminal end | 1700 | 10 | Heat | ⊚ |
| Comparative Example 6-1 | None | — | — | — | X |

When compared to Comparative Example 6-1 containing no second additive, the aggregation suppression effect was obtained when the second additive was contained.

Example 7

CNT was grown by using a fine particle array substrate formed by using the method according to the embodiment. Fe fine particles were arranged on a substrate following the same procedures as in Example 1. However, a silicon substrate having a thermal oxidation film was used instead of the glass substrate, and the substrate was directly coated with the fine particles without depositing any underlayer or the like.

CNT was grown on this fine particle array substrate. First, to expose the surfaces of the fine particles, stearic acid and polyester acrylate on the fine particle surfaces were removed by RIE using $O_2$ gas. After that, CNT was grown on the fine particle surfaces by CVD using methane gas. It was confirmed by sectional TEM observation that CNT was surely grown on the Fe fine particles.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A magnetic recording medium manufacturing method comprising:

forming a magnetic recording layer on a substrate;
forming a mask layer on the magnetic recording layer;
coating the mask layer with a fine particle coating solution containing fine particles coated with a protective layer containing a mixture of a first additive including a straight-chain structure for increasing wettability to the mask layer, and at least one type of a first functional group selected from the group consisting of an amino group, a carboxy group, a hydroxy group, and a sulfo group, and a second additive including at least one type of a second functional group selected from the group consisting of an amino group, a carboxy group, a hydroxy group, and a sulfo group, and a polymerizable functional group, each fine particle having, on at least a surface thereof, a material selected from the group consisting of aluminum, silicon, titanium, vanadium, chromium, manganese, iron, cobalt, nickel, zinc, yttrium, zirconium, tin, molybdenum, tantalum, tungsten, and oxides thereof, thereby forming a fine particle monolayer on the mask layer;

applying heat or light energy to the fine particle layer to cause a reaction of the polymerizable functional group, thereby curing the protective layer and fixing the protective layer on the mask layer;
transferring a periodic pattern formed by the fine particle layer to the mask layer;
transferring the periodic pattern to the magnetic recording layer; and
removing the mask layer from the magnetic recording layer.

2. The method according to claim 1, further comprising, before the coating the mask layer with the fine particle coating solution, mixing an additive mixture prepared by dispersing the first additive and the second additive in a solvent with a fine particle dispersion prepared by dispersing the fine particles in the solvent, and causing the first functional group of the first additive to react with and adhere to the fine particle surfaces, thereby preparing the fine particle coating solution.

3. The method according to claim 1, wherein a main chain of the first additive contains at least one type of a material selected from the group consisting of polyethylene, polyester, polyurethane, polypropyrene, polyacrylate, polymethacrylate, and epoxy.

4. The method according to claim 1, wherein the polymerizable functional group contains at least one type of a material selected from the group consisting of an acryloyl group, a methacryloyl group, an epoxy group, an oxetane ring, and a vinyl ether group.

5. The method according to claim 1, wherein the second additive has an SP value of 18 $(MPa)^{1/2}$ to 25 $(MPa)^{1/2}$.

6. The method according to claim 1, wherein the coating of the fine particle coating solution is performed by a method selected from a spin coating method, a dip coating method, and an LB method.

7. A magnetic recording medium manufacturing method comprising:

coating a substrate with a fine particle coating solution containing fine particles coated with a protective layer containing a mixture of a first additive including a straight-chain structure for increasing wettability to the substrate, and at least one type of a first functional group selected from the group consisting of an amino group, a carboxy group, a hydroxy group, and a sulfo group, and a second additive including at least one type of a second functional group selected from the group consisting of an amino group, a carboxy group, a hydroxy group, and a sulfo group, and a polymerizable functional group, each fine particle having, on at least a surface thereof, a material selected from the group consisting of aluminum, silicon, titanium, vanadium, chromium, manganese, iron, cobalt, nickel, zinc, yttrium, zirconium, tin, molybdenum, tantalum, tungsten, and oxides thereof, thereby forming a fine particle monolayer;

applying heat or light energy to the fine particle layer to cause a reaction of the polymerizable functional group, thereby curing the protective layer and fixing the protective layer on the substrate;

removing the protective layer between the fine particles by etching, thereby forming a periodic pattern by the fine particles; and forming a magnetic recording layer on the periodic pattern.

8. The method according to claim 7, further comprising, before the coating the substrate with the fine particle coating solution, mixing an additive mixture prepared by dispersing the first additive and the second additive in a solvent with a fine particle dispersion prepared by dispersing the fine particles in the solvent, and causing the first functional group of the first additive to react with and adhere to the fine particle surfaces, thereby preparing the fine particle coating solution.

9. The method according to claim 7, wherein a main chain of the first additive contains at least one type of a material selected from the group consisting of polyethylene, polyester, polyurethane, polypropyrene, polyacrylate, polymethacrylate, and epoxy.

10. The method according to claim 7, wherein the polymerizable functional group contains at least one type of a material selected from the group consisting of an acryloyl group, a methacryloyl group, an epoxy group, an oxetane ring, and a vinyl ether group.

11. The method according to claim 7, wherein the second additive has an SP value of 18 $(MPa)^{1/2}$ to 25 $(MPa)^{1/2}$.

12. The method according to claim 7, wherein the coating of the fine particle coating solution is performed by a method selected from a spin coating method, a dip coating method, and an LB method.

13. A magnetic recording medium manufacturing method comprising:

forming an underlayer on a substrate;

coating the underlayer with a fine particle coating solution containing fine particles coated with a protective layer containing a mixture of a first additive including a straight-chain structure for increasing wettability to the underlayer, and at least one type of a first functional group selected from the group consisting of an amino group, a carboxy group, a hydroxy group, and a sulfo group, and a second additive including at least one type of a second functional group selected from the group consisting of an amino group, a carboxy group, a hydroxy group, and a sulfo group, and a polymerizable functional group, each fine particle having, on at least a surface thereof, a material selected from the group consisting of aluminum, silicon, titanium, vanadium, chromium, manganese, iron, cobalt, nickel, zinc, yttrium, zirconium, tin, molybdenum, tantalum, tungsten, and oxides thereof, thereby forming a fine particle monolayer;

applying heat or light energy to the fine particle layer to cause a reaction of the polymerizable functional group, thereby curing the protective layer and fixing the protective layer on the underlayer; transferring a periodic pattern formed by the fine particle layer to the underlayer; and forming a magnetic recording layer on the underlayer.

14. The method according to claim 13, further comprising, before the coating the underlayer with the fine particle coating solution, mixing an additive mixture prepared by dispersing the first additive and the second additive in a solvent with a fine particle dispersion prepared by dispersing the fine particles in the solvent, and causing the first functional group of the first additive to react with and adhere to the fine particle surfaces, thereby preparing the fine particle coating solution.

15. The method according to claim 13, wherein a main chain of the first additive contains at least one type of a material selected from the group consisting of polyethylene, polyester, polyurethane, polypropyrene, polyacrylate, polymethacrylate, and epoxy.

16. The method according to claim 13, wherein the polymerizable functional group contains at least one type of a material selected from the group consisting of an acryloyl group, a methacryloyl group, an epoxy group, an oxetane ring, and a vinyl ether group.

17. The method according to claim 13, wherein the second additive has an SP value of 18 $(MPa)^{1/2}$ to 25 $(MPa)^{1/2}$.

18. The method according to claim 13, wherein the coating of the fine particle coating solution is performed by a method selected from a spin coating method, a dip coating method, and an LB method.

19. A pattern formation method comprising:

coating a target layer with a fine particle coating solution containing fine particles coated with a protective layer containing a mixture of a first additive including a straight-chain structure for increasing wettability to a surface of the target layer, and at least one type of a first functional group selected from the group consisting of an amino group, a carboxy group, a hydroxy group, and a sulfo group, and a second additive including at least one type of a second functional group selected from the group consisting of an amino group, a carboxy group, a hydroxy group, and a sulfo group, and a polymerizable functional group, each fine particle having, on at least a surface thereof, a material selected from the group consisting of aluminum, silicon, titanium, vanadium, chromium, manganese, iron, cobalt, nickel, zinc, yttrium, zirconium, tin, molybdenum, tantalum, tungsten, and oxides thereof, thereby forming a fine particle monolayer on the target layer; and applying heat or light energy to the fine particle layer to cause a reaction of the polymerizable functional group, thereby curing the protective layer and fixing the protective layer on the target layer, and forming a periodic pattern by the fine particle layer.

20. The method according to claim 19, further comprising, before the coating the target layer with the fine particle coating solution, mixing an additive mixture prepared by dispersing the first additive and the second additive in a solvent with a fine particle dispersion prepared by dispersing the fine particles in the solvent, and causing the first functional group of the first additive to react with and adhere to the fine particle surfaces, thereby preparing the fine particle coating solution.

21. The method according to claim 19, wherein a main chain of the first additive contains at least one type of a material selected from the group consisting of polyethylene, polyester, polyurethane, polypropyrene, polyacrylate, polymethacrylate, and epoxy.

22. The method according to claim 19, wherein the polymerizable functional group contains at least one type of a material selected from the group consisting of an acryloyl group, a methacryloyl group, an epoxy group, an oxetane ring, and a vinyl ether group.

23. The method according to claim 19, wherein the second additive has an SP value of 18 $(MPa)^{1/2}$ to 25 $(MPa)^{1/2}$.

24. The method according to claim 19, wherein the coating of the fine particle coating solution is performed by a method selected from a spin coating method, a dip coating method, and an LB method.

\* \* \* \* \*